United States Patent
Adams et al.

(10) Patent No.: US 8,046,688 B2
(45) Date of Patent: Oct. 25, 2011

(54) SYSTEM FOR AND METHOD OF ADJUSTING TEMPO TO MATCH AUDIO EVENTS TO VIDEO EVENTS OR OTHER AUDIO EVENTS IN A RECORDED SIGNAL

(75) Inventors: Dennis J. Adams, Madison, WI (US); Michael J. Bryant, Madison, WI (US)

(73) Assignees: Sony Corporation, Tokyo (JP); Sony Pictures Entertainment Inc., Culver City, CA (US)

( * ) Notice: Subject to any disclaimer, the term of this patent is extended or adjusted under 35 U.S.C. 154(b) by 1492 days.

(21) Appl. No.: 11/459,548

(22) Filed: Jul. 24, 2006

(65) Prior Publication Data

US 2006/0259862 A1 Nov. 16, 2006

Related U.S. Application Data

(63) Continuation of application No. 09/882,646, filed on Jun. 15, 2001, now abandoned.

(51) Int. Cl.
*G06F 3/00* (2006.01)
(52) U.S. Cl. .......... 715/723; 715/726; 715/835; 715/716
(58) Field of Classification Search .................. 715/723, 715/726, 835, 716
See application file for complete search history.

(56) References Cited

U.S. PATENT DOCUMENTS

| | | | | |
|---|---|---|---|---|
| 5,519,828 | A * | 5/1996 | Rayner | 715/723 |
| 5,642,171 | A | 6/1997 | Baumgartner et al. | |
| 5,664,216 | A * | 9/1997 | Blumenau | 715/234 |
| 5,690,496 | A * | 11/1997 | Kennedy | 434/307 R |
| 5,732,184 | A * | 3/1998 | Chao et al. | 386/55 |
| 5,758,093 | A * | 5/1998 | Boezeman et al. | 709/249 |
| 5,781,188 | A * | 7/1998 | Amiot et al. | 715/723 |
| 5,969,716 | A * | 10/1999 | Davis et al. | 715/726 |
| 6,154,601 | A * | 11/2000 | Yaegashi et al. | 386/52 |
| 6,188,396 | B1 | 2/2001 | Boezeman et al. | |
| 6,897,880 | B2 | 5/2005 | Samra | |
| 7,254,455 | B2 * | 8/2007 | Moulios | 700/94 |

* cited by examiner

*Primary Examiner* — Michael Roswell
(74) *Attorney, Agent, or Firm* — Samuel S. Lee; Procopio, Cory, Hargreaves & Savitch LLP (57) ABSTRACT

The system and method herein adjust tempo of an audio recording to match audio events to video events or other audio events in an audio-visual recording. The process of fitting an audio segment to a video or audio segment can include receiving a reference indicating a location in a recorded signal where the reference indicates a desired audio tempo change location in the recorded signal and providing a tempo for an audio recording to be at least partially included in the recorded signal. The tempo is provided to fit the audio recording to a section of the recorded signal marked by the reference.

20 Claims, 7 Drawing Sheets

SYSTEM FOR AND METHOD OF ADJUSTING TEMPO TO MATCH AUDIO EVENTS TO VIDEO EVENTS OR OTHER AUDIO EVENTS IN A RECORDED SIGNAL

CROSS-REFERENCE TO RELATED APPLICATIONS

The present application is a continuation of U.S patent application Ser. No. 09/882,646, filed Jun. 15, 2001 now abandoned. Benefit of priority of the above-referenced application with a filing date of Jun. 15, 2001 is hereby claimed, and the disclosure of this application is incorporated in its entirety herein.

FIELD OF THE INVENTION

The present invention relates generally to computerized signal processing methods and systems. Further, an exemplary embodiment of the present invention relates to a system for and a method of adjusting tempo to match audio events to video events or other audio events in a recorded signal.

BACKGROUND OF THE INVENTION

A wide variety of computer systems have been used to create, edit, deliver, and store recorded digital signals, such as, music and video. Such computer systems generally include commercially-available computer program products which allow people to create music and/or videos from multiple recorded signals, edit the music and/or videos in a variety of ways including combining and changing multiple recorded signals, and store the music and/or video in some medium that allows the user to deliver the music and/or video in some fashion. Examples of such computer program products include programs, such as, ACID™, VEGAS® Video and Vegas Audio, and SIREN™ Juke Box software programs developed and sold by Sonic Foundry, Inc., of Madison, Wis. These exemplary programs are described and can be purchased on the Internet at http://www.sonicfoundry.com.

Such computer-readable recorded signals (of music and/or videos) can be stored in a variety of different computer storage formats. A wide variety of computer file formats can be used to store recorded signals, depending on the software application used and file format selected. Example file formats include the Moving Picture Experts Group Layer-3 Audio (MP3) audio file format, MICROSOFT wave (WAV) audio file format, Windows Media Audio (WMA) audio file format, QUICKTIME audio-video format, or audio video interleave (AVI) format.

Heretofore, music and/or videos have been produced using computers and other electronic devices. Therefore, such music or videos can include rhythms which repeat at very precise intervals. Disc jockeys, for example, count on the precision of such rhythms to synchronize playback and create new mixes of music. Producers of videos, as another example, utilize the effects of changing musical rhythms, volume, and other such effects to achieve a variety of results in videos. Computer systems can be particularly helpful in the synchronization and manipulation of such music and/or videos because of the capacity of computers to combine and process audio and video signals, maintain large libraries of songs and visual images, and store such creations for later delivery.

One of the challenges in matching audio and video is the need to adjust the tempo of the audio as to have it coincide with the video or other audio. For example, when a video scene changes from a slow moving pastoral scene to a series of action shots, a video producer or composer may want the style and tempo of the music to reflect this change. Arranging the music such that the downbeat (i.e., the strongest beat in a measure of music) of the musical phrase is synchronized with a change in scene can emphasize or complement the video, making for a better experience for the viewer. Nevertheless, computer programs have not heretofore provided for the adjustment of tempo to match audio and video or other audio.

Thus, there is a need to synchronize audio and video changes such that music changes with the accompanying video in a way that makes sense visually and audibly. Further, there is a need to determine the tempo of a portion of music such that one phrase ends and another begins at a frame of video or portion of audio that the producer or composer wants to emphasize or complement. Even further, there is a need to automate the process of calculating and creating a musical tempo map to facilitate the synchronization of audio to video or other audio.

The teachings hereinbelow extend to those embodiments which fall within the scope of the appended claims, regardless of whether they accomplish one or more of the above-mentioned needs.

SUMMARY OF THE INVENTION

The present invention relates to a system for and method of adjusting tempo of an audio recording to match audio events to either audio or video events in an audio-visual recording. Techniques involved in the present invention can include determining the tempo of a portion of music such that one tempo phrase ends and another tempo phrase begins at a frame of video or portion of audio which the producer or composer wants to emphasize or complement. The process of fitting an audio segment to a video or audio segment can include receiving a reference indicating a location in a recorded signal where an audio tempo change is desired and providing a tempo for an audio recording to be at least partially included in the recorded signal based on the reference.

An exemplary embodiment of the present invention relates to a method of adjusting tempo of an audio recording to match audio events to video or other audio events in an audio-visual recording. This method can include receiving a reference indicating a location in a recorded signal and providing a tempo for an audio recording to be at least partially included in the recorded signal. The reference is indicative of a desired audio tempo change location in the recorded signal. The tempo is provided to fit the audio recording to a section of the recorded signal marked by the reference.

Another exemplary embodiment of the present invention relates to a system in a computer program product of determining the tempo of a portion of music such that one tempo phrase ends and another tempo phrase begins at a frame of video or portion of audio as desired by a user of the computer program product. This system can include means for receiving a reference indicating a location in the recorded signal and means for providing a tempo for an audio recording segment to be included in the recorded signal. The tempo is provided to fit the audio recording segment to a section of the recorded signal marked by the reference.

Another exemplary embodiment of the present invention relates to a processing system. This processing system can include a central processing unit (CPU) and a storage device coupled to a processor and having stored there information for configuring the CPU. The CPU can be configured to receive a reference indicating a location in the recorded signal and to provide a tempo for an audio recording segment to be included in the recorded signal. The tempo is provided to fit the audio recording segment to a section of the recorded signal marked by the reference.

Another exemplary embodiment of the present invention relates to a graphical user interface configured to display representations of audio signals and video signals and being further configured to provide for creation of an audio or an audio visual production using a plurality of audio or video recordings. The graphical user interface can include a first graphical display area on which graphical representations of a first audio recording can be displayed, a second graphical display area on which graphical representations of a second audio or video recording can be displayed, and a reference marker which is configured to be selectively located by a user. The reference marker can be used in the tempo synchronization of at least a portion of the first audio recording and at least a second audio or video recording.

Other features and advantages of embodiments of the present invention will become apparent to those skilled in the art upon review of the following drawings, the detailed description, and the appended claims.

BRIEF DESCRIPTION OF THE DRAWINGS

The invention is illustrated by way of example and not limitation using the figures of the accompanying drawings, in which like references indicate similar elements and in which.

DETAILED DESCRIPTION OF THE EXEMPLARY EMBODIMENTS

A system for and method of adjusting tempo to match audio events to video or audio events are described. In the following description, for purposes of explanation, numerous specific details are set forth to provide a thorough understanding of exemplary embodiments of the invention. It will be evident, however, to one skilled in the art that the invention may be practiced without these specific details. In other instances, structures and devices are shown in block diagram form to facilitate description of the exemplary embodiments.

In one embodiment, a computer system is used which has a central processing unit (CPU) that executes sequences of instructions contained in a memory. More specifically, execution of the sequences of instructions causes the CPU to perform steps, which are described below. The instructions may be loaded into a random access memory (RAM) for execution by the CPU from a read-only memory (ROM), a mass storage device, or some other persistent storage. In other embodiments, hardwired circuitry may be used in place of, or in combination with, software instructions to implement the functions described. Thus, the embodiments described herein are not limited to any specific combination of hardware circuitry and software, nor to any particular source for the instructions executed by the computer system.

FIGS. 1-6 illustrate exemplary displays which include graphical user interfaces (GUIs) which can be utilized in an exemplary system or method. As this description provides exemplary embodiments, other user interfaces can also be utilized for a variety of different platforms. For example, different user interfaces can be used with wireless application protocol (WAP) devices, personal digital assistants (PDAs), or any device which can be configured to perform the exemplary functions described herein.

Figure 1:
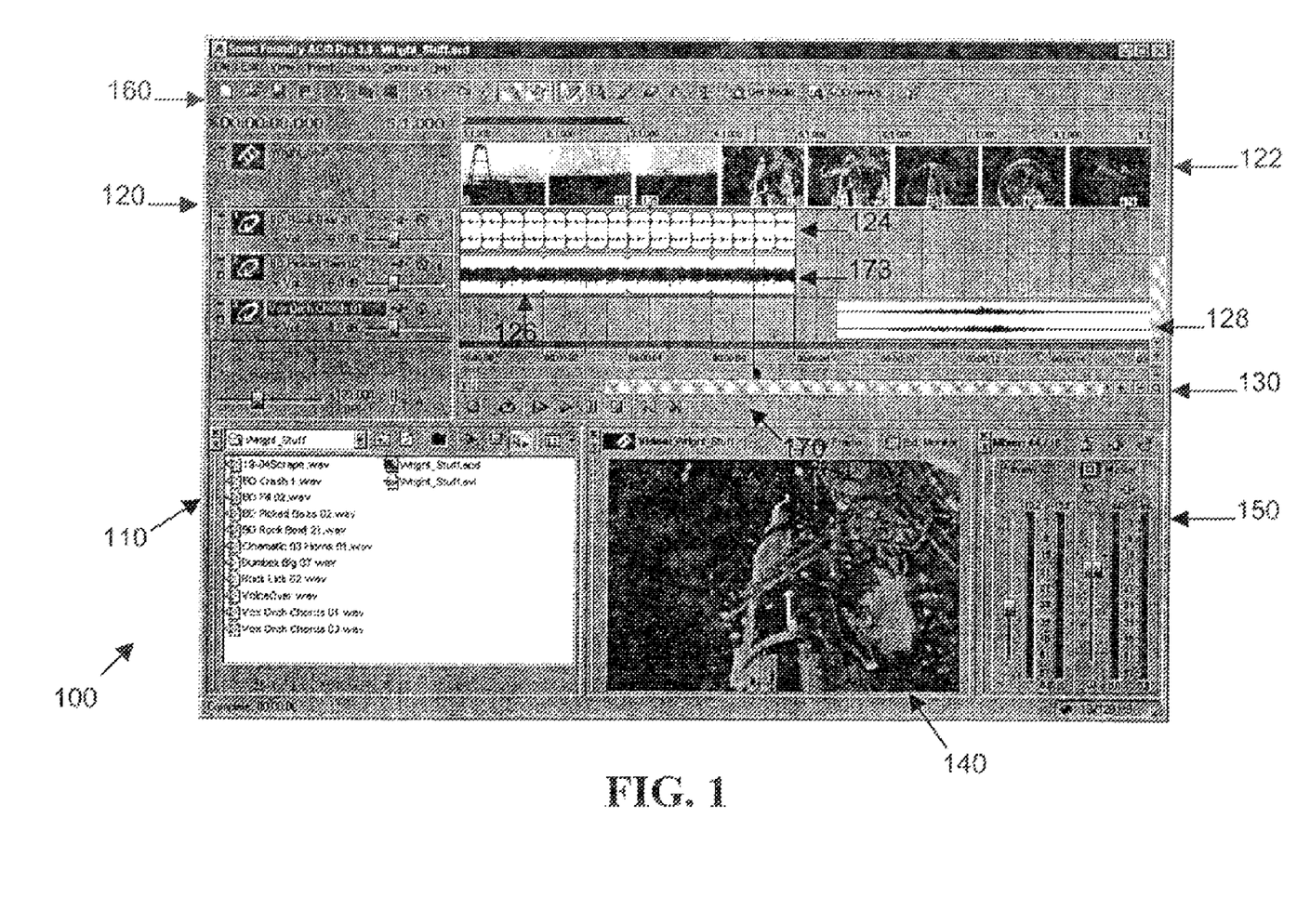
FIG. 1 is a display of a graphical user interface used to select time markers in a process of automatically adjusting the tempo of an audio recording to match audio events to video or audio events in accordance with an exemplary embodiment.

FIG. 1 illustrates a display 100 including an explorer window section 110, a track view section 120, a track controls section 130, a presentation window section 140, a controls section 150, and a operation commands section 160. In an exemplary embodiment, explorer window section 110 provides indications of computer readable files stored in a computer memory which is accessible by a computer that provides display 100. Such files can be stored electronically in any of a variety of data formats, such as, the Moving Picture Experts Group Layer-3 (MP3) audio file format, MICROSOFT wave (WAV) audio file format, Windows Media Audio (WMA) audio file format, or any format which is readable by a computing device, such as, a personal computer (PC) or a hand held personal digital assistant (PDA). Video files can be in QUICKTIME format or audio video interleave (AVI) format. Still image files can be in any of a variety of data formats, such as, Joint Pictures Expert Group (JPEG) format and PHOTOSHOP (PSD) format. Furthermore, film, such as, digitized film can also be stored in a computer readable file and accessed by the computer that provides display 100.

An audio or video file can be selected from explorer window section 110 using a computer input device, such as, a touch pad, a mouse, a keyboard, or any such peripheral device providing an indication of which file is desired. In one embodiment, a person can select a particular file by using a computer mouse to click on the file indication and symbolically drag a graphical representation of the file to track view section 120. Track view section 120 provides graphical depictions of audio and video files over time. Audio files can be depicted using an audio waveform and video files can be depicted using a number of video frames from the video file.

Where a video file is symbolically dragged into track view section 120, an accompanying audio track can also be automatically added to track view section 120, if the selected video file includes an audio track. In one embodiment, if the video file has an accompanying silent audio track, a silent audio track can be added to track view section 120. Silent audio tracks included in track view section 120 can be subsequently deleted by the user. In another embodiment, if the video file does not have an accompanying audio track, no audio track is added to the view section 120.

In an exemplary embodiment, only one video track can be inserted in track view section 120 at a time. Nevertheless, the audio portion of a second video track can be added regardless of whether or not the original video track is replaced by the second video. Adding an audio portion of a second video track can be an advantageous feature where two video cameras shoot the same event and the first camera has the better video quality, but the audio from both cameras can be used to work with in the final mix.

Track view section 120 allows for the manipulation of video file 122. As such, a composer can adjust the timing of the video file using click and drag functions available with a computer input device, such as, a computer mouse or touch pad. When the video file is manipulated by, for example, moving video frames, audio originally accompanying the video does not move with the video unless the composer chooses to resynchronize the audio with the video by selecting a "Synchronizing with Video" option. A wide variety of additional video editing functions can be performed, such as, edge trimming to remove small portions of unwanted video.

Track controls section 130 provide controls for operations which can be performed on files displayed in track view section 120. For example, track controls section 130 can include play, rewind, fast forward, pause, stop, loop, and scrolling functions. A scroll or slider bar for tempo control can also be provided in track controls section 130. Presentation window section 140 can present the audio and video tracks included in track view section 120. Advantageously, presentation window section 140 provides for the reproduction of a combination of the audio and video signals in track view section 120. Controls section 150 includes various controls for operations which can be performed on the file displayed in presentation window section 140, such as, volume. Operations command section 160 can include a variety of operations which can be performed on the combination of files in track view section 120, such as, save and insert.

In an exemplary embodiment, track view section 120 includes a video file 122 and audio files 124, 126, and 128. Interacting with display 100, a person can provide a time marker 170 at a particular time location of video or audio. Time marker 170 can be a location where there is a desired change in tempo of an audio file or a desired change in an audio file. Time marker 170 indicates the particular time location (e.g., time 7.007 seconds or frame 210 of video) such that the tempo of the audio segment can be adjusted. As an example of tempo adjustment, if time marker 170 marks video frame number 210 which occurs 7.007 seconds into the video, the music which has been scored for the video up to video frame number 210 should be fit into 7.007 seconds. If the music has four measures and four beats per measure, the music has sixteen total beats which must fit into 7.007 seconds. Accordingly, the tempo should be set to sixteen divided by 7.007, or 2.28343 beats per second, which is 137.005 beasts per minute (2.28343*60 seconds in a minute).

In an exemplary embodiment, the user can use a computer input device to place a cursor at a downbeat 173 of bar number five of audio files in track view section 120. Then, the user can use a computer mouse (or other such computer input device) to right click on time marker 170 and select "Adjust Tempo to Match Marker to Cursor". The tempo necessary to synchronize the audio to the video is calculated and applied to the audio.

Figure 2:
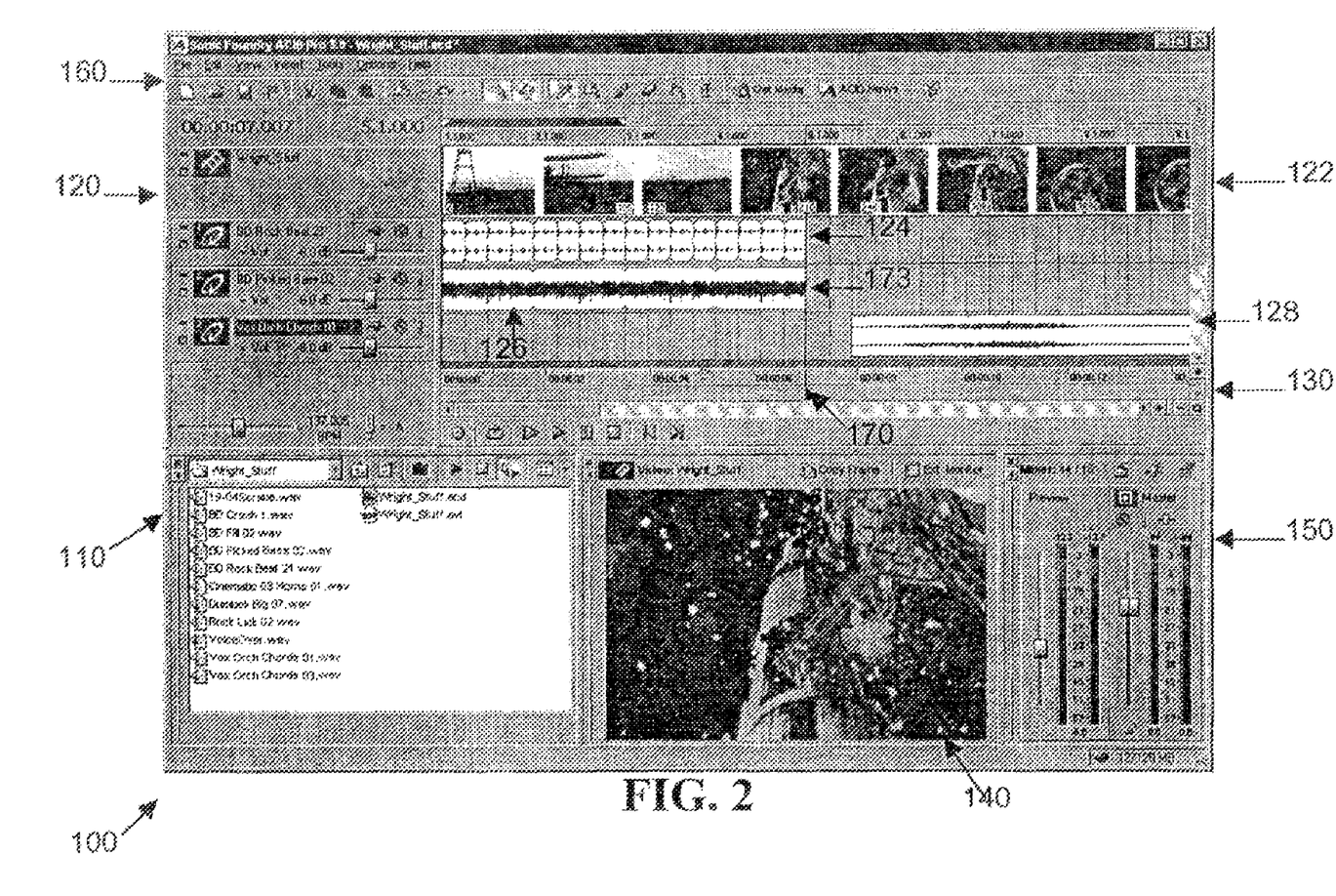
FIG. 2 is a display of a graphical user interface used to display adjusted audio tempo in a process of automatically adjusting the tempo of an audio recording to match audio events to video or audio events in accordance with an exemplary embodiment.

FIG. 2 illustrates display 100 where audio tempo has been adjusted based on time marker 170. The tempo adjustment aligns the downbeat 173 of bar number five with time marker 170. In an exemplary embodiment, the user can lock the tempo of the scene using a command, such as, a key input from the computer keyboard. The user can then proceed to subsequent scenes and adjust the tempo of later scenes without changing the locked adjusted tempo of earlier scenes. A series of tempos for multiple scenes can be referred to as a tempo map for the video file.

Figure 3:
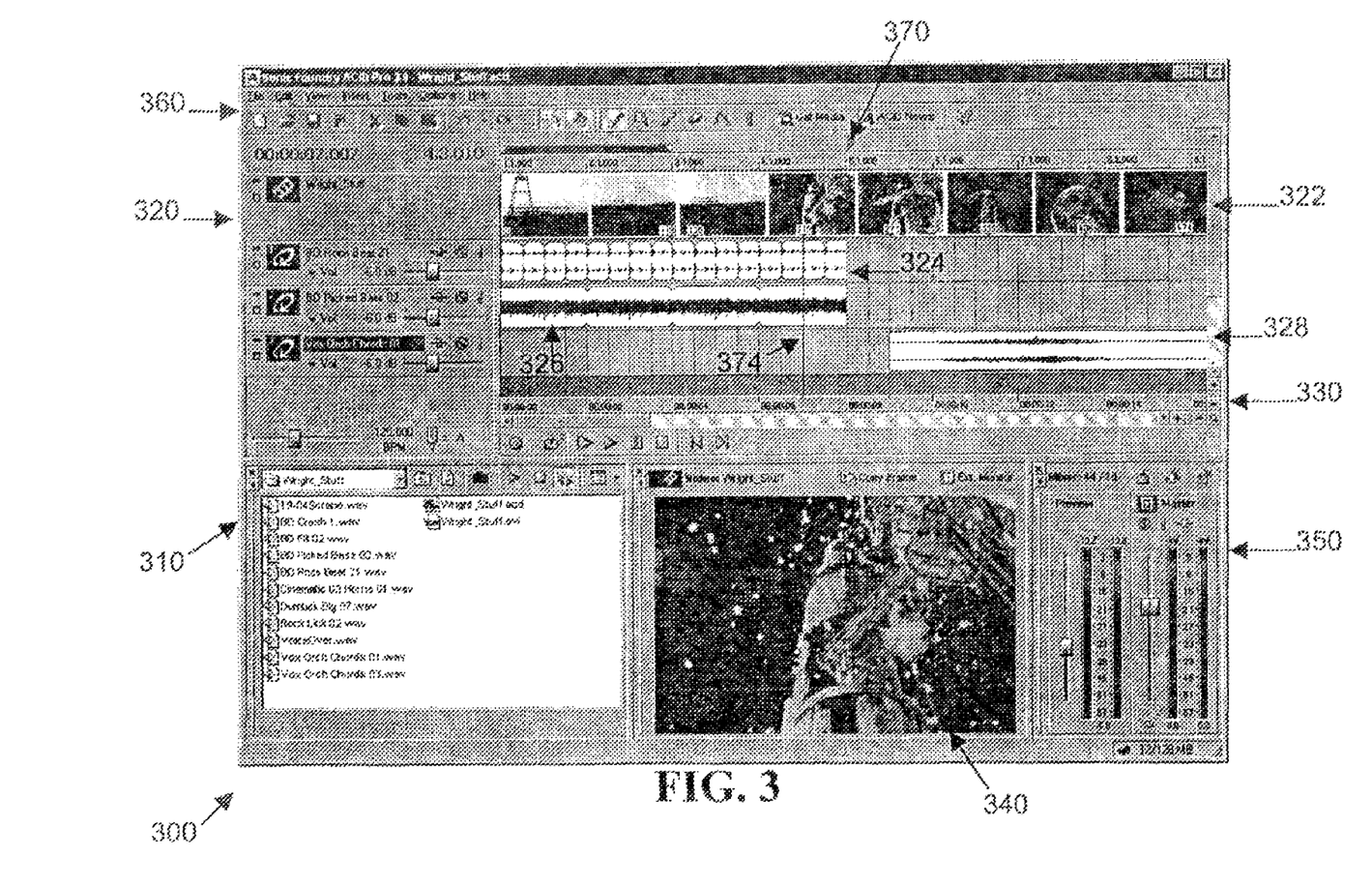
FIG. 3 is a display of a graphical user interface used to select location markers in a process of automatically adjusting the tempo of an audio recording to match audio events to video or audio events in accordance with an exemplary embodiment.

Referring now to FIG. 3, a display 300 can include an explorer window section 310, a track view section 320, a track controls section 330, a presentation window section 340, a controls section 350, and an operation section 360. Display 300 is substantially similar in appearance and functionality to display 100 described with reference to FIG. 1. Display 300 can include a video file 322 and audio files 324, 326, and 328. Interacting with display 300, a person or user can provide a location marker 370 at a particular location in an audio file (e.g., measure 5, beat 1, 0 ticks). For example, location marker 370 can be set to a location in audio files 324 and 326. Then, the user can use a computer input device, such as, a computer mouse to place a cursor 374 at time 7.007 or frame number 210 of the video. The user can right-click on location marker 370 and select "Adjust Tempo to Match Cursor to Marker". The tempo necessary to synchronize the audio and video or other audio is calculated and applied to the audio.

Figure 4:
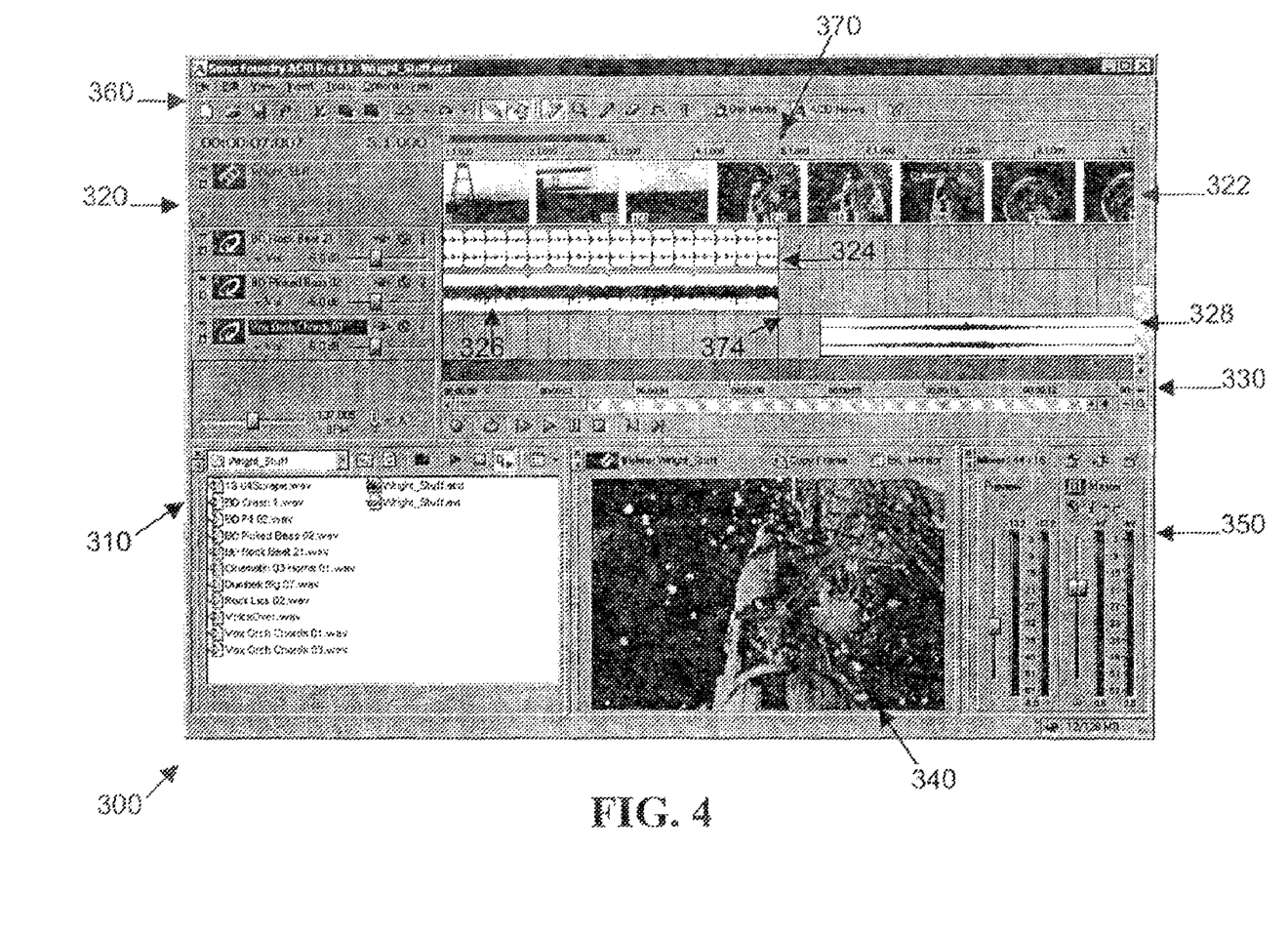
FIG. 4 is a display of a graphical user interface used to display adjusted audio tempo in a process of automatically adjusting the tempo of an audio recording to match audio events to video or audio events in accordance with an exemplary embodiment.

FIG. 4 illustrates display 300 where audio tempo has been adjusted based on location marker 370 in audio files 324 and 326. The tempo adjustment aligns time 7.007 seconds (cursor 374) with location marker 370 (e.g., measure 5, beat 1, 0 ticks) due to tempo being set at 137.005 beats per minute (BPM).

Figure 5:
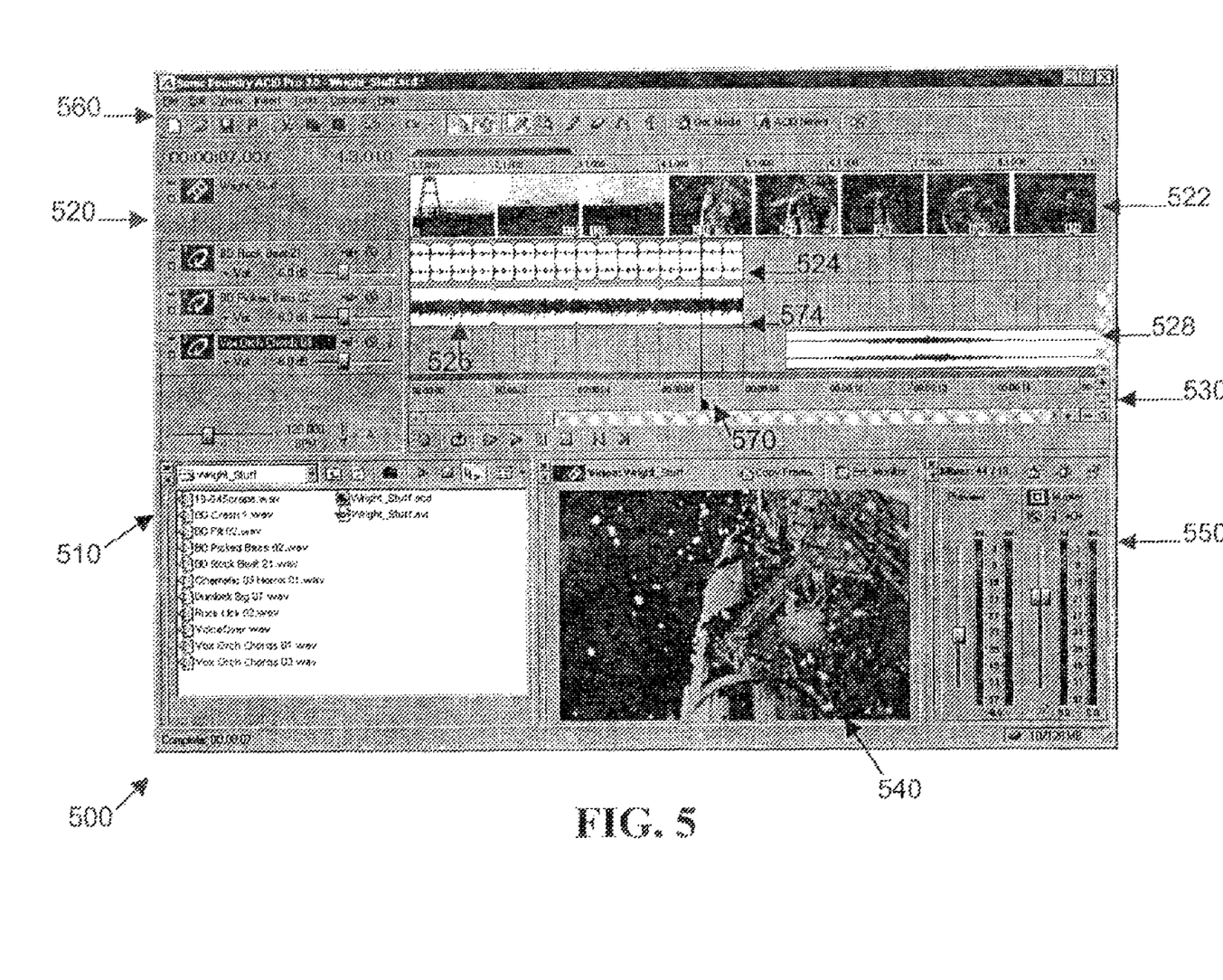
FIG. 5 is a display of a graphical user interface used to select time markers in a process of automatically adjusting the tempo of an audio recording to match audio events to video or audio events in accordance with an exemplary embodiment.

Referring now to FIG. 5, a display 500 can include an explorer window 510, a track view section 520, a track controls section 530, a presentation window section 540, a controls section 550, and an operations section 560. Display 500 is substantially similar in appearance and functionality to display 100 described with reference to FIG. 1 and display 300 described with reference to FIG. 3. Display 500 can include a video file 522 and audio files 524, 526, and 528.

Interacting with display 500, a person or user can provide a time marker 570 at a particular time location of video or audio (e.g., time 7.007 seconds or frame 210 of video). Then, the user can hold a key or some computer input and drag time marker 570 to a location 574 (e.g., measure 5, beat 1, 0 ticks) in the audio file to which the audio file is to be synchronized. In an exemplary embodiment, the computer has a snap option which assists a user by permitting a dragged item to only be dropped or located on a downbeat of the audio file.

Figure 6:
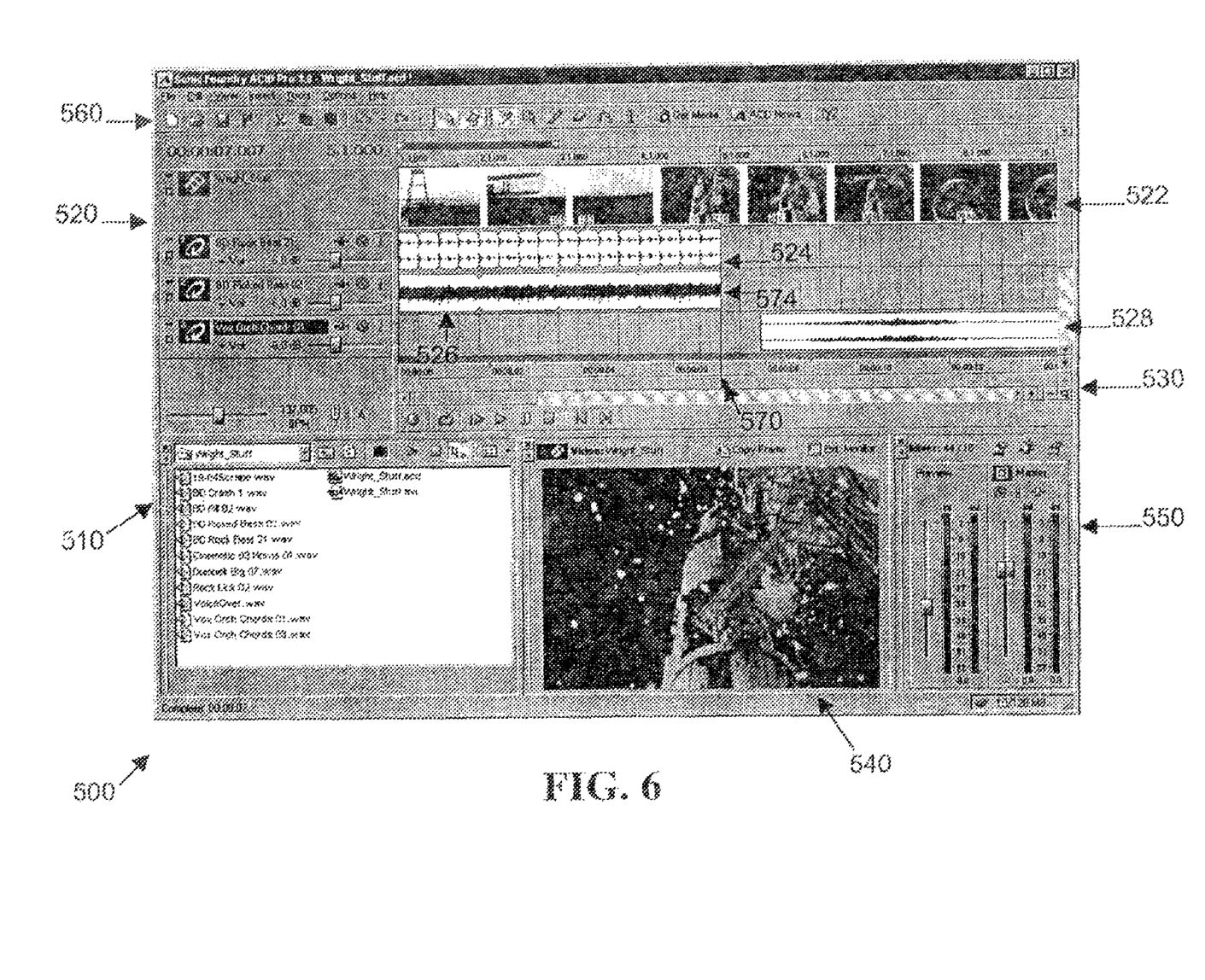
FIG. 6 is a display of a graphical user interface used to display adjusted audio tempo in a process of automatically adjusting the tempo of an audio recording to match audio events to video or audio events in accordance with an exemplary embodiment.

FIG. 6 illustrates display 500 where audio tempo has been adjusted based on time marker 570. The tempo adjustment aligns location 574 (e.g., measure 5, beat 1, 0 ticks) with time marker 570 (time 7.007 seconds or frame number 210 of video) due to tempo being set to 137.005 beats per minute (BPM).

In another exemplary embodiment, a composer or producer may want to synchronize music to a voice over, such as, the case when composing music for a radio drama. As such, tempo adjustment of an audio track by the system and method described can be made to another audio track. Advantageously, the system and method described with reference to FIGS. 1-6 can be utilized to place reference markers at points in the dialog that need to be synchronized with a musical score. The tempo of the musical score can then be adjusted as described herein. The system and method is configured to change the tempo of the music without changing the pitch. Advantageously, the system and method illustrated by the FIGURES can also be configured to preserve matched location or time points such that any tempo changes made at earlier points in the project do not un-match matched points.

Figure 7:
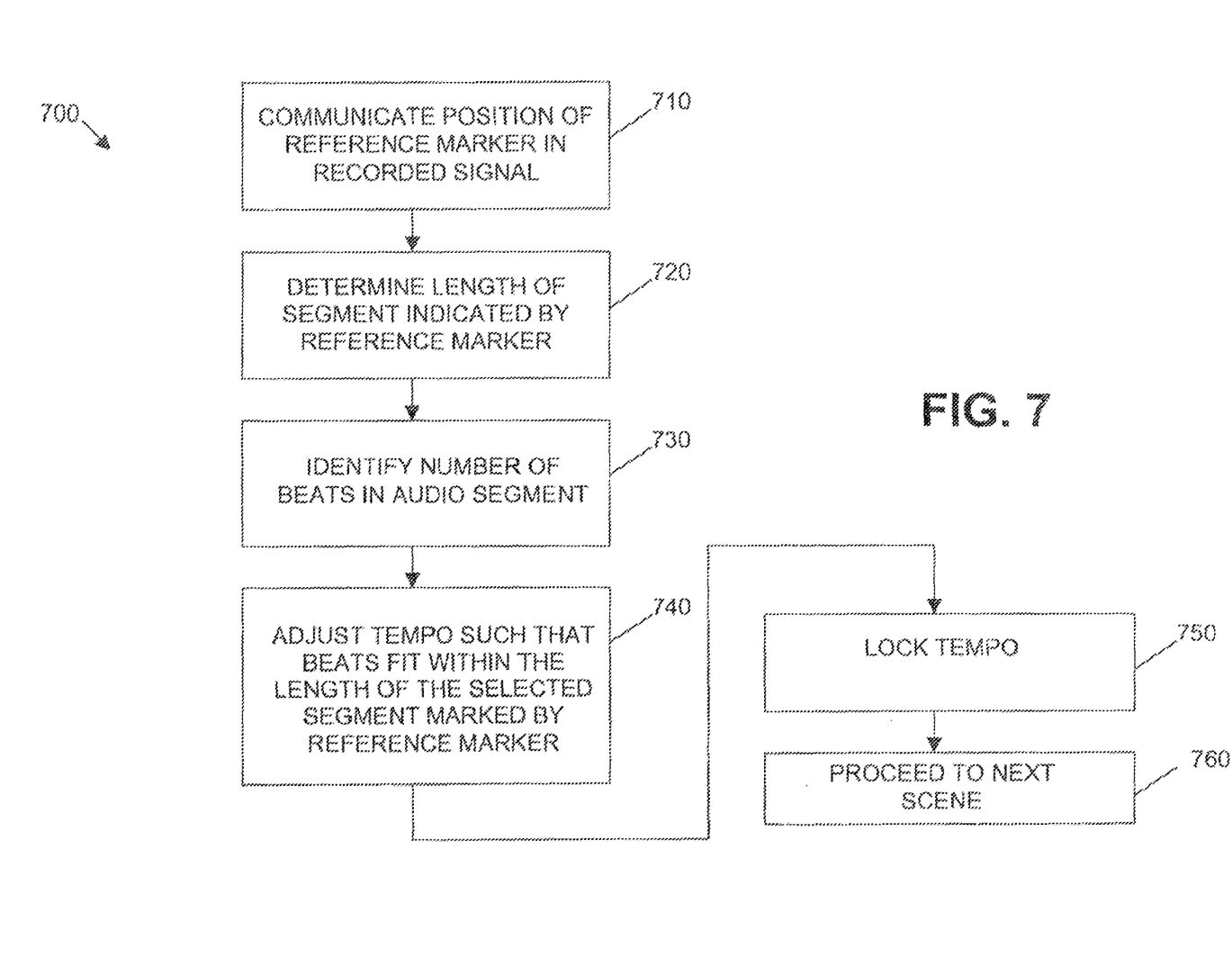
FIG. 7 is a flow diagram depicting steps in a method of automatically adjusting the tempo of an audio recording to match audio events to video or audio events in accordance with an exemplary embodiment.

FIG. 7 illustrates a flow diagram 700 depicting exemplary steps in a process of automatically adjusting tempo of an audio recording to march audio events to video events. In a step 710, the position of a reference marker in a video is communicated. In one embodiment, a composer or producer can use a computer input device to indicate the desired location of a reference marker in the video. As discussed with reference to FIGS. 1-6, reference marker can indicate where in a video the composer wants to change an audio track in some manner. For example, a reference marker can indicate a desired location for a change in tempo or a change in audio mix.

After step 710, a step 720 is performed in which the length of the video or audio segment indicated by the reference marker is determined. Where the video or audio segment is at the beginning of the video or audio, the length of the video or audio segment can be the difference between the start time (e.g., $t_{start}=0$ seconds) and the time of the first marker (e.g., $t_{first}=200$ seconds). Where the video or audio segment is not at the beginning of the video or audio, the length of the video segment is the difference between the time of a first reference A (e.g., $t_A=400$ seconds) and a second reference B (e.g., $t_B=450$ seconds). In an exemplary embodiment, the first reference is the last reference used and the second reference is the next reference following the first reference.

After step 720, a step 730 is performed in which the number of beats in an audio segment to be associated with the video or other audio segment is identified. In one embodiment, the number of beats in an audio segment is determined from information contained in the audio field. In alternative embodiments, the number of beats in an audio segment can be determined using the system and method described in U.S. patent application Ser. No. 09/835,253, entitled SYSTEM FOR AND METHOD OF DETERMINING THE PERIOD OF RECURRING EVENTS WITHIN A RECORDED SIGNAL, filed on Apr. 13, 2001, assigned to the same assignee as the present application, and incorporated herein to the present application by reference. In an alternative embodiment, the number of beats in an audio segment are determined in other ways, including, for example, input by a person manually counting beats.

After step 730, a step 740 is performed in which the tempo of the audio segment is adjusted such that the beats of the audio segment fit within the length of the selected video or audio segment. The tempo is adjusted to reflect the number of beats in the audio segment and the length of the video segment. Mathematically, the adjusted tempo can be represented as follows:

$$AdjustedTempo = \frac{\text{Number of Beats in Audio Segment}}{\text{Length of Segment Selected by Reference Marker}}$$

As an example, where twenty beats are in an audio segment and a selected video segment is five seconds, the adjusted tempo is four beats per second, or 240 beats per minute (bpm).

After step 740, a step 750 can be performed in which the composer or producer can lock the tempo of the current audio segment. In an exemplary embodiment, a composer can lock the tempo by inputting a key from a computer keyboard or using any other computer input device to select the lock option. After step 750, a step 760 is performed in which the composer proceeds to the next scene in the video or audio and selects another reference marker.

Advantageously, the system and method described with reference to the FIGURES provides for a variety of applications. For example, the system and method provides for an improved ability to transition from one recorded signal to another recorded signal. As such, a smooth transition from one song having a first tempo to a second song having a different tempo can be automated. In one application, video clips can be automatically edited such that transitions between different clips occur at the proper location. As such, the time necessary to do video editing is dramatically decreased. Furthermore, separate audio, video, and other media files can be automatically combined and be synchronized. One example of techniques for automatically adjusting tempo of an audio recording can be found in the software product ACID 3.0 developed and marketed by Sonic Foundry, Inc., of Madison, Wis., and available on the Internet at the http://www.sonicfoundry.com.

While the embodiments illustrated in the FIGURES and described above are presently preferred, it should be understood that these embodiments are offered by way of example only. Other embodiments may include additional procedures or steps not described here. The invention is not limited to a particular embodiment, but extends to various modifications, combinations, and permutations that nevertheless fall within the scope and spirit of the appended claims.

What is claimed is:

1. A method of automatically adjusting a tempo of an audio segment, comprising:
   displaying a first sequential depiction of at least some of a video or audio file;
   displaying a second sequential depiction of at least some of the audio segment;
   displaying a marker in response to receiving a first user input, wherein the marker is displayed at or near the first sequential depiction, and wherein the marker defines a portion of the video or audio file;
   displaying a cursor in response to receiving a second user input, wherein the cursor is displayed at or near the second sequential depiction, and wherein the cursor defines the audio segment; and
   automatically adjusting the tempo of the audio segment using the marker and the cursor so that the duration of the audio segment substantially matches the duration of the portion of the video or audio file.

2. The method of claim 1, wherein the tempo is adjusted without changing the pitch of the audio segment.

3. The method of claim 1, wherein the marker corresponds to a video scene change.

4. The method of claim 1. wherein the cursor corresponds to a downbeat in the audio segment.

5. The method of claim 1, wherein the automatically adjusting occurs in response to receiving a third user input:

6. The method of claim 5, wherein the third user input comprises a mouse click.

7. The method of claim 5, wherein the third user input is only a single mouse click.

8. The method of claim 5, wherein the third user input comprises dragging the marker.

9. The method of claim 1, further comprising:
   locking the adjusted tempo during a tempo adjustment of another audio segment.

10. The Method of claim 1, further comprising:
    generating and outputting a tempo map that comprises a series of tempos for the video or audio tile.

11. An apparatus for automatically adjusting a tempo of an audio segment, comprising:
    a first sequential depiction of at least some of a video or audio file:

a second sequential depiction of at least some of the audio segment;

a marker displayed in response to receiving a first user input, wherein the marker is displayed at or near the first sequential depiction, and wherein the marker defines a portion of the video or audio file;

a cursor displayed in response to receiving a second user input, wherein the cursor is displayed at or near the second sequential depiction, and wherein the cursor defines the audio segment; and a processing unit that automatically adjusts the tempo of the audio segment using the marker and the cursor so that the duration of the audio segment substantially matches the duration of the portion of the video or audio file.

12. The apparatus of claim 11, wherein the processing unit adjusts the tempo without changing the pitch of the audio segment.

13. The apparatus of claim 11, wherein the marker corresponds to a video scene change.

14. The apparatus of claim 11, wherein the cursor corresponds to a downbeat in the audio segment.

15. The apparatus of claim 11, wherein the processing unit adjusts the tempo in response to receiving a third user input.

16. The apparatus of claim 15, wherein the third user input comprises a mouse click.

17. The apparatus of claim 15, wherein the third user input is only a single mouse click.

18. The apparatus of claim 15, wherein the third user input comprises dragging the marker.

19. The apparatus of claim 11, wherein the adjusted tempo is locked during a tempo adjustment of another audio segment.

20. The apparatus of claim 11, wherein the processing unit generates and outputs a tempo map that comprises a series of tempos for the video or audio file.

* * * * *